(12) United States Patent
Kono et al.

(10) Patent No.: US 10,411,549 B2
(45) Date of Patent: Sep. 10, 2019

(54) ROTATING ELECTRIC MACHINE HAVING PROTECTIVE COVER FOR IMPROVING ROTOR

(71) Applicant: Hitachi Automotive Systems, Ltd., Hitachinaka-shi, Ibaraki (JP)

(72) Inventors: Yohei Kono, Hitachinaka (JP); Hisashi Wada, Hitachinaka (JP); Junnosuke Nakatsugawa, Hitachinaka (JP); Ippei Suzuki, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 296 days.

(21) Appl. No.: 14/892,426

(22) PCT Filed: Mar. 12, 2014

(86) PCT No.: PCT/JP2014/056391
§ 371 (c)(1),
(2) Date: Jan. 28, 2016

(87) PCT Pub. No.: WO2014/188766
PCT Pub. Date: Nov. 27, 2014

(65) Prior Publication Data
US 2016/0149461 A1    May 26, 2016

(30) Foreign Application Priority Data

May 20, 2013  (JP) ................................. 2013-105725

(51) Int. Cl.
*H02K 1/27* (2006.01)
*H02K 5/128* (2006.01)
*H02K 1/30* (2006.01)

(52) U.S. Cl.
CPC ............ *H02K 5/128* (2013.01); *H02K 1/2733* (2013.01); *H02K 1/278* (2013.01); *H02K 1/30* (2013.01)

(58) Field of Classification Search
CPC ........ H02K 1/2733; H02K 1/278; H02K 1/30; H02K 1/32; H02K 5/128
(Continued)

(56) References Cited

U.S. PATENT DOCUMENTS

| 2009/0102304 | A1* | 4/2009 | Yamamura | ............. | H02K 1/278 |
|  |  |  |  |  | 310/156.28 |
| 2009/0108694 | A1* | 4/2009 | Hanai | .................... | H02K 1/278 |
|  |  |  |  |  | 310/156.16 |

(Continued)

FOREIGN PATENT DOCUMENTS

| JP | 6-105505 A | 4/1994 |
| JP | 6-153427 A | 5/1994 |

(Continued)

OTHER PUBLICATIONS

Tanaka et al., English Translation of JP 2012070585, Apr. 5, 2012.*
(Continued)

*Primary Examiner* — Julio C. Gonzalez
*Assistant Examiner* — Rashad H Johnson
(74) *Attorney, Agent, or Firm* — Crowell & Moring LLP (57) ABSTRACT

A small and low-price rotating electric machine has a structure where a magnet end surface and a metal tube end are not in contact with each other. The rotating electric machine has a cylindrical stator core, a rotor having a shaft provided on the inner circumferential side of the stator core, a yoke fixed to the shaft, at least one ferrite magnet provided on the outer circumferential surface of the yoke, and a protective cover provided on the outer circumference of the ferrite magnet. The ferrite magnet end surface is projected (Continued)

with respect to an end surface of the yoke, and has a step portion to form a gap between the end surface of the ferrite magnet and a bottom surface of the protective cover.

9 Claims, 7 Drawing Sheets

(58) Field of Classification Search
USPC .............................................. 310/156.08, 86
See application file for complete search history.

(56) References Cited

U.S. PATENT DOCUMENTS

| | | | | |
|---|---|---|---|---|
| 2013/0257184 | A1* | 10/2013 | Haga | H02K 1/278 310/43 |
| 2016/0126793 | A1* | 5/2016 | Kawasaki | H02K 1/278 310/156.08 |
| 2016/0352197 | A1* | 12/2016 | Kawaguchi | H02K 1/146 |

FOREIGN PATENT DOCUMENTS

| | | |
|---|---|---|
| JP | 2004-254394 A | 9/2004 |
| JP | 2012-70585 A | 4/2012 |
| JP | 2013-21780 A | 1/2013 |

OTHER PUBLICATIONS

Kobayashi et al., English Translation of JP H06105505, Apr. 15, 1994.*

Fukazawa et al., English Machine Translation of JP 2004254394 (Year: 2004).*

International Search Report (PCT/ISA/210) issued in PCT Application No. PCT/JP2014/056391 dated May 20, 2014 with English-language translation (four (4) pages).

* cited by examiner

ROTATING ELECTRIC MACHINE HAVING PROTECTIVE COVER FOR IMPROVING ROTOR

TECHNICAL FIELD

The present invention relates to a rotating electric machine.

BACKGROUND ART

As a background art of the present technical field, Japanese Unexamined Patent Application Publication No. 6-105505 (Patent Literature 1) is known. This publication discloses a magnetic rotor where a cylindrical metal tube as a protective cover is engaged with an outer circumferential part of a magnet. Excellent airtight closing of the magnet is attained so as to improve the quality of the rotor.

CITATION LIST

Patent Literature

Patent Literature 1: Japanese Unexamined Patent Application Publication Hei No. 6-105505

SUMMARY OF INVENTION

Technical Problem

In Patent Literature 1, the axial length of the magnet is equivalent to a yoke core of the rotor. The cylindrical metal tube is engaged with the outer circumferential portion and an end surface of the metal tube is bent at a sharp angle toward the inner circumferential side, such that the sharp angle part is in direct contact with the yoke core. In this structure, excellent airtight closing of the magnet is attained without application of any stress to the magnet.

However, the dimensional tolerance when the machine is manufactured without any process of the axial length of the magnet is generally about ±2% of the axial length. When the machine is manufactured with 50 mm magnet axial length without any process, the tolerance is about ±1 mm. Further, when the metal tube is bent at a sharp angle as in the case of Patent Literature 1 to attain an airtight structure of the magnet, an end surface of the magnet and an end of the metal tube might be in contact due to the large dimensional tolerance.

Further, as a magnet used in the rotating electric machine, neodymium magnets and ferrite magnets are known. The magnetic force of the ferrite magnet is weaker than that of the neodymium magnet. When the ferrite magnet is used, to ensure as much of a magnetic force as possible, the length of the ferrite magnet may be prolonged with respect to a yoke core. In such case, as in the case of Patent Literature 1, when the end of a metal tube end as a protective cover is bent at a sharp angle, there is influence of dimensional tolerance, and there is a high probability of contact between the magnet end surface and the end of the metal tube.

Solution to Problem

To solve the above problem, for example, a structure described in the claims is adopted. The present application includes plural means to solve the above problem. As an example, a rotating electric machine includes: a cylindrical stator core; a rotor having a shaft provided on the inner circumferential side of the stator core; a yoke fixed to the shaft; at least one ferrite magnet provided on an outer circumferential surface of the yoke; and a protective cover provided on the outer circumference of the ferrite magnet. An end surface of the ferrite magnet is projected with respect to an end surface of the yoke, and has a step portion to form a gap between the end surface of the ferrite magnet and a bottom surface of the protective cover.

Advantageous Effects of Invention

According to the present invention, since the structure where the magnet end surface and the metal tube end portion are not in contact with each other is attained, it is possible to provide a small and low-price rotating electric machine.

DESCRIPTION OF EMBODIMENTS

Hereinbelow, an embodiment will be described using FIGS. 1 to 13.

Figure 1:
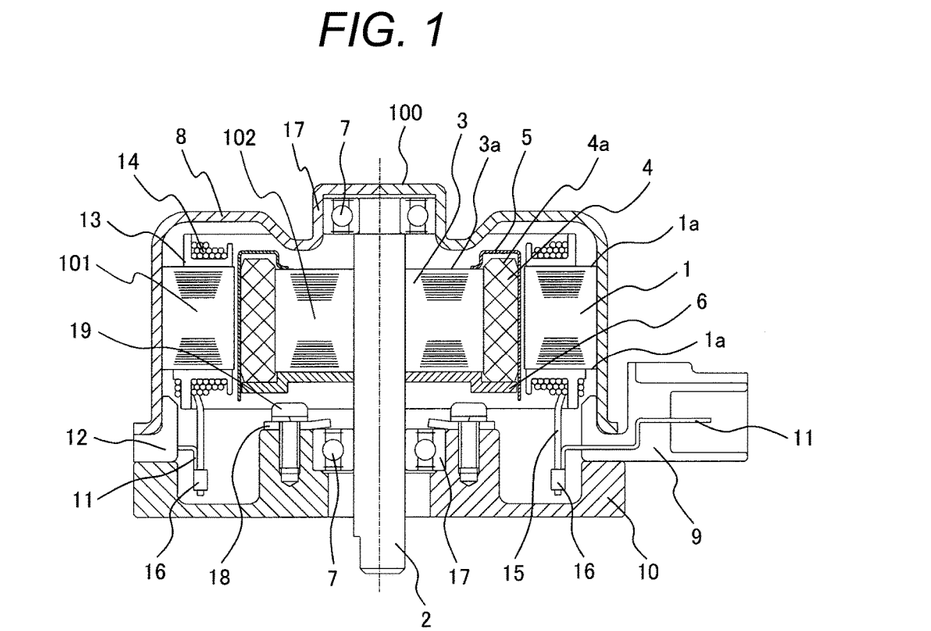
FIG. 1 is a cross-sectional diagram of a rotating electric machine using a ferrite magnet in an embodiment of the present invention.

First, a schematic configuration of a rotating electric machine as an example of the present invention will be described. FIG. 1 is a cross-sectional diagram of a rotating electric machine 100. In the rotating electric machine 100, a stator 101 is fixed by fit insertion or the like to the inner circumference of a bottomed cylindrical housing 8. A rotor 102 is formed via a gap on the inner diameter side of the stator 101.

The rotor 102 has a shaft 2 and a yoke 3 fixed to the shaft 2 by fit insertion or the like. Further, a ferrite magnet 4, an end plate 6 for positioning of the ferrite magnet 4 in an axial direction, and a cylindrical protective cover to protect the ferrite magnet 4 from extraneous impact, and when dispersion of the ferrite magnet 4 itself, or crack or chip of the ferrite magnet 4 occurs due to a centrifugal force by rotation, prevent the dispersion of pieces by the crack or chip from the rotor 102, are provided on the outer circumferential surface of the yoke 3.

The stator 101 is molded with nylon or the like on a cylindrical stator core 1 formed by laminating plural press-punched magnetic steel thin plates. The stator has an insulating bobbin 13, and a coil winding 14 wound around the bobbin 13.

As a terminal table 12, plural bus bars 11 to connect the coil winding 14 to an external power source are molded with resin and inserted in the housing 8. The plural bus bars 11 have a connecting portion 16 for electrical connection to a coil end 15 of the coil winding 14. The plural bus bars 11 are electrically connected to the coil winding 14 by fusing or the like. Further, a connector housing 9 is also formed integrally with the terminal table 12. The terminal table 12 has a disc shape except a projection portion of the connector housing 9.

The shaft 2 of the rotor 102 is fixed to the inner ring side of two bearings 7 and is rotatably supported. The outer ring of the bearing 7 is accommodated respectively in the housing 8 and a bearing case 17 of a cover 10. The end of the outer ring of the bearing 7 on the cover 10 side is pressed and fixed with a plate 18 screw-fixed with a bolt 19 to the cover 10, to regulate movement of the rotor 102 in the axial direction.

Next, an embodiment of the present invention will be described using FIGS. 1 to 13.

The rotor 102 has the yoke 3 fixed to the shaft 2, the ferrite magnet 4 provided on the outer circumferential surface of the yoke 3, the end plate 6 for positioning of the ferrite magnet 4 in the axial direction, and the protective cover 5 to protect the ferrite magnet 4 from extraneous impact or the like or prevent dispersion of the ferrite magnet 4. The yoke 3 is formed by laminating plural press-punched magnetic steel thin plates. It is possible to simultaneously punch the thin plates and the stator core 1 using the material of the stator core 1 on the inner diameter side.

The ferrite magnet 4 is fixed by fit-inserting the protective cover 5 in the ferrite magnet 4, and with the fit-insertion, by pressing the ferrite magnet 4 against the yoke 3. Further, the fixing may be made by applying adhesive between the yoke 3 and the ferrite magnet 4 and between the ferrite magnet 4 and the protective cover 5.

The axial length of the yoke 3 is shorter than the axial direction of the ferrite magnet 4. The ferrite magnet has a projection 4a projected from a yoke end surface 3a at both ends. Further, the axial length of the stator core 1 is also shorter than the ferrite magnet 4, and has a projection 4a at both ends from a stator core end surface 1a.

As the ferrite magnet 4 has the projection 4a and the magnetic force of the projection 4a is efficiently used, it is possible to improve the characteristic and attain downsizing.

Further, in the entire cost of the rotating electric machine 100 according to the present embodiment, the percentage of the unit price of the ferrite magnet 4 is low. It is lower than the unit prices of the stator core 1 (including the yoke 3) and the coil winding 14. As the ferrite magnet 4 has the projection 4a, the axial lengths of the stator core 1 and the yoke 3 are made as short as possible, and the amount of use of the coil winding 14 is reduced, it is possible to attain weight reduction and suppress the cost to a minimum.

With the present embodiment, it is possible to provide a small a low-price rotating electric machine.

Figure 2:
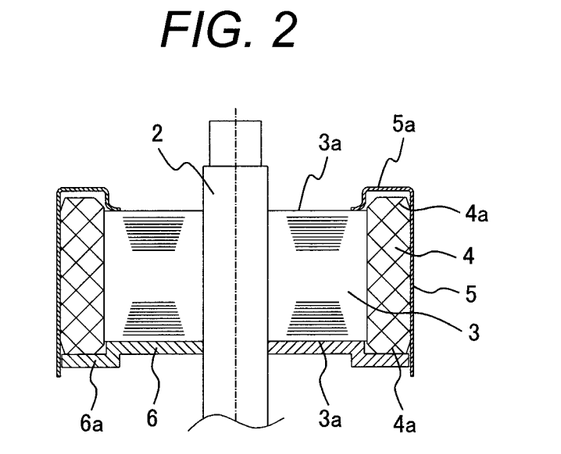
FIG. 2 is a detailed cross-sectional diagram (part 1) of a rotor.

FIG. 2 is a detailed cross-sectional diagram (part 1) of the rotor 102.

The rotor 102 has the yoke 3 which is fixed to the shaft 2 and formed by laminating plural press-punched magnetic steel thin plates, the ferrite magnet 4 provided on the outer circumferential surface of the yoke 3, the end plate 6 for positioning of the ferrite magnet 4 in the axial direction, and the protective cover 5 to protect the ferrite magnet 4 from extraneous impact or the like or prevent dispersion of the ferrite magnet 4.

The protective cover 5 has a concave portion 5a to avoid the projection 4a of the ferrite magnet 4. The concave portion 5a is formed with an outer circumferential wall of the protective cover 5, a bottom surface 23, and a step portion 24 as a side wall on the yoke 3 side.

Figure 3:
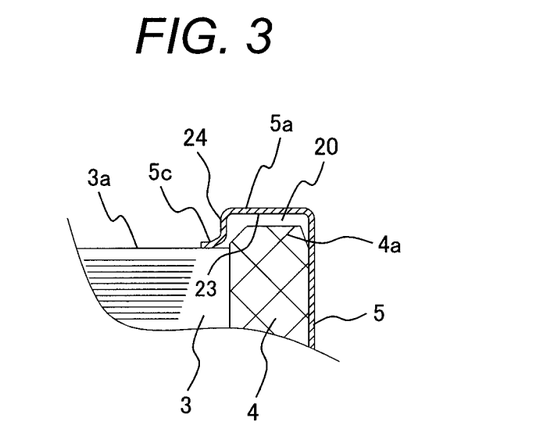
FIG. 3 is an enlarged diagram of a concave portion in the detailed cross-sectional diagram (part 1).

FIG. 3 is an enlarged diagram of the concave portion 5a.

A gap 20 is formed between the concave portion 5a and the projection 4a to prevent occurrence of crack or chip of the ferrite magnet 4 upon fit-insertion of the protective cover 4 when the concave portion 5a and the projection 4a are brought into contact with each other and stress is applied to the projection 4a.

Further, an end bent portion 5c is provided on the inner circumferential side of the concave portion 5a. The end bent portion 5c and the yoke end surface 3a are in contact with each other. Even upon occurrence of crack or chip in the ferrite magnet 4, it is possible to prevent drop of the pieces of the ferrite magnet toward the rotor 102 to lock the rotor 102.

The end plate 6 has a step portion 6a in contact with the projection 4a of the ferrite magnet 4. It regulates the positions of the yoke end surface 3a and the projection 4a.

Figure 4:
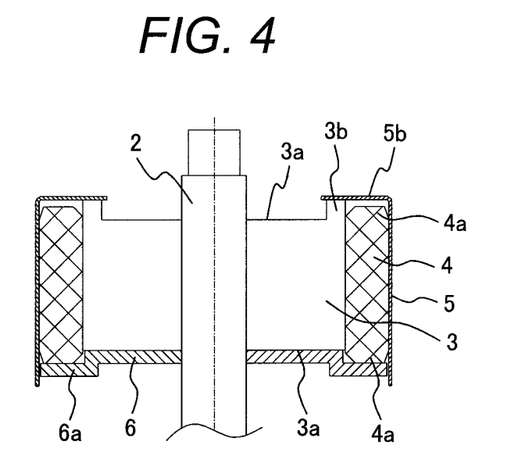
FIG. 4 is a detailed cross-sectional diagram (part 2) of the rotor.

FIG. 4 is a detailed cross-sectional diagram (part 2) of the rotor 102.

The rotor 102 has the yoke 3 which is fixed to the shaft 2 and formed with pure material of the iron-core, the ferrite magnet 4 provided on the outer circumferential surface of the yoke 3, the end plate 6 for positioning of the ferrite magnet 4 in the axial direction, and the protective covet 5 to protect the ferrite magnet 4 from extraneous impact or the like and to prevent dispersion of the ferrite magnet 4.

The yoke 3 has a yoke step portion 3b projected from the yoke end 3a on the outer circumferential side. Further, the end surface of the protective cover 5 is provided with an L-shaped bent portion 5b bent in L shape toward the inner circumferential side.

Figure 5:
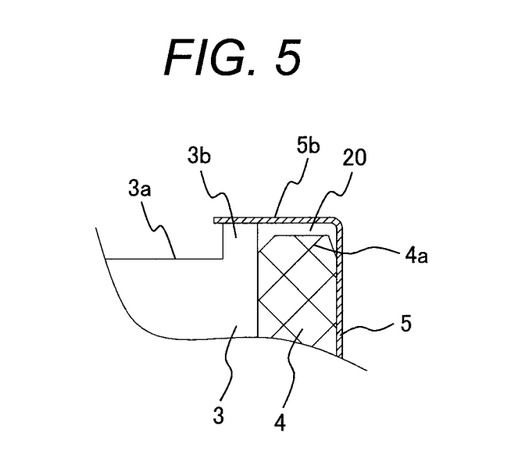
FIG. 5 is an enlarged diagram of an L-shaped bent portion in the detailed cross-sectional diagram (part 2).

FIG. 5 is an enlarged diagram of the L-shaped bent portion 5b.

Upon fit-insertion of the protective cover 4, the L-shaped bent portion 5b has the gap 20 so as to prevent contact between the projection 4a and the L-shaped bent portion 5b due to contact with the yoke step portion 3b prior to the contact with the projection 4a. In the case of the present embodiment, the yoke step portion 3b serves as a step portion to form a gap between the protective cover 5 and the end surface of the ferrite magnet 4.

Figure 6:
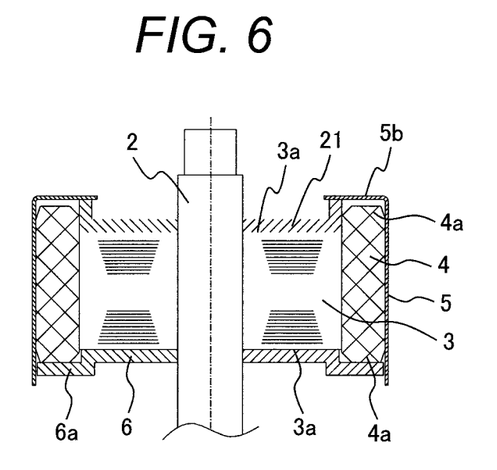
FIG. 6 is a detailed cross-sectional diagram (part 3) of the rotor.

FIG. 6 is a detailed cross-sectional diagram (part 3) of the rotor 102.

The rotor 102 has the yoke 3 formed by laminating plural press-punched magnetic steel thin plates, the ferrite magnet 4 provided on the outer circumferential surface of the yoke 3, the end plate 6 for positioning of the ferrite magnet 4 in the axial direction, the protective cover 5 to protect the ferrite magnet 4 from extraneous impact or the like or prevent dispersion of the ferrite magnet 4, and a second end plate 21 provided on the opposite side to the end plate 6.

A second step portion 21a is provided on the outer circumferential side of the second end plate 21. Further, the end surface of the protective cover 5 has the L-shaped bent portion 5b bent in L shape toward the inner circumferential side.

Figure 7:
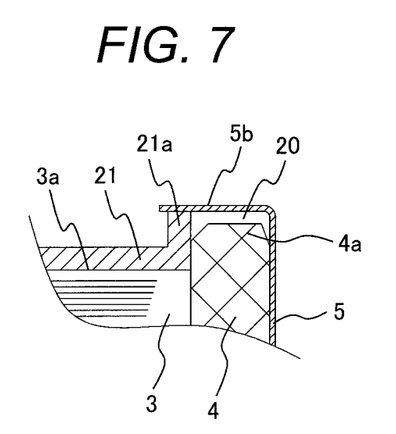
FIG. 7 is an enlarged diagram of the L-shaped bent portion in the detailed cross-sectional diagram (part 3).

FIG. 7 is an enlarged diagram of the L-shaped bent portion 5b.

Upon fit-insertion of the protective cover 4, the L-shaped bent portion 5b has a gap 20 formed so as to prevent contact between the projection 4a and the L-shaped bent portion 5b due to contact with the second step portion 21a prior to the projection 4a.

Figure 8:
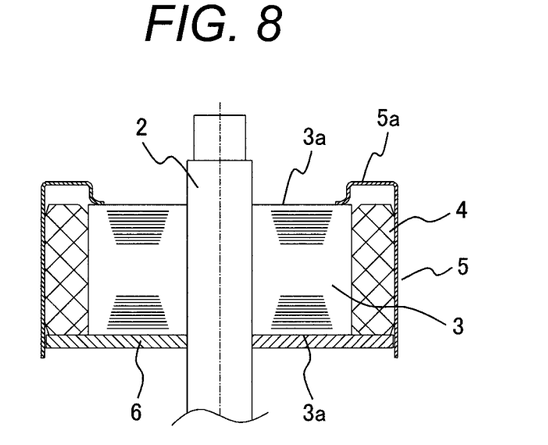
FIG. 8 is a detailed cross-sectional diagram (part 4) of the rotor.

FIG. 8 is a detailed cross-sectional diagram (part 4) of the rotor 102.

The rotor 102 has the yoke 3 which is fixed to the shaft 2 and is formed by laminating plural magnetic steel thin plates, the ferrite magnet 4 provided on the outer circumferential surface of the yoke 3, the end plate 6 for positioning in the axial direction, and the protective cover 5 to protect the ferrite magnet 4 from extraneous impact or the like or prevent dispersion of the ferrite magnet 4.

The end plate 6 has a flat plate shape. One yoke end surface 3a and one end surface of ferrite magnet 4 are positioned flush with the end plate 6.

Further, the protective cover 5 has the concave portion 5a.

Figure 9:
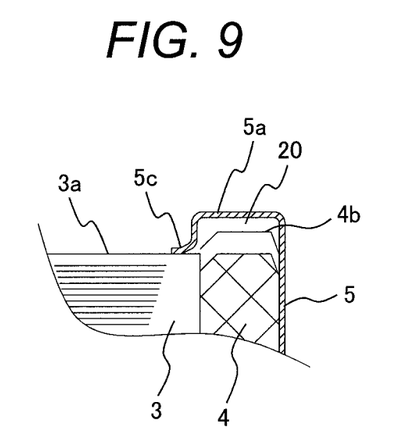
FIG. 9 is an enlarged diagram of the concave portion in the detailed cross-sectional diagram (part 4).

FIG. 9 is an enlarged diagram of the concave portion 5a.

There is a possibility that the ferrite magnet 4 has a tolerance projection 4b projected from the yoke end surface 3a by tolerance variation in the axial length. The protective cover 5 has the concave portion 5a to form the gap 20 to avoid contact with the tolerance projection 4b.

When the axial lengths of the yoke 3 and the ferrite magnet 4 are set such that the tolerance projection 4b is not projected by tolerance from the yoke end surface 3a, the axial length of the yoke 3 is wastefully longer than the axial length of the ferrite magnet 4. When the yoke 3 and the stator core 1 are simultaneously punched and the yoke 3 and the stator core 1 have the same axial length, the cost is much influenced.

Accordingly, as the protective cover 5 has the concave portion 5a, even when the tolerance projection 4b is projected from the yoke end surface 3a, the gap 20 is formed. It is possible to suppress the axial length of the yoke 3 to a minimum, and attain weight reduction and realize cost-advantageous machine.

Figure 10:
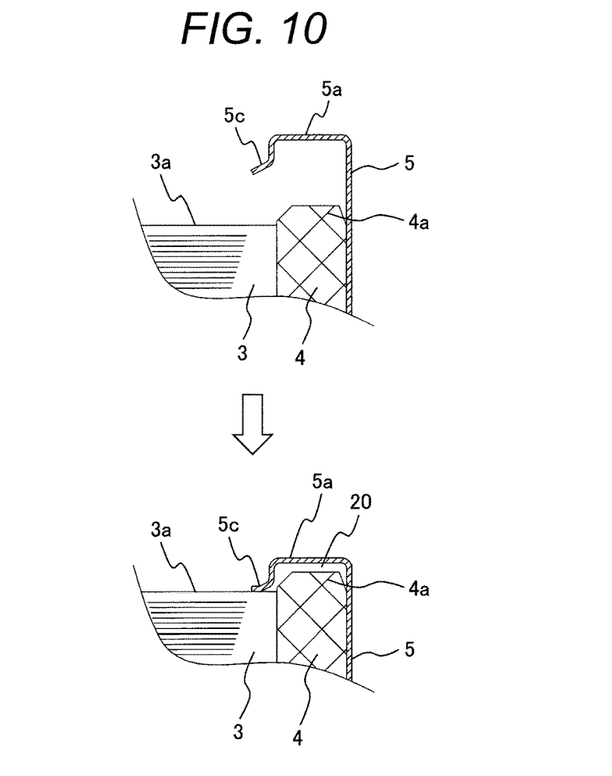
FIG. 10 is an enlarged diagram of an end bent portion and a diagram of dimensional-tolerance absorbing structure of a protective cover.

FIG. 10 is an enlarged diagram of the end bent portion 5c of the protective cover 5 and a dimensional-tolerance absorbing structure diagram of the protective cover 5.

The end bent portion 5c is bent at a sharp angle. When the protective cover 5 is fit-inserted, the end bent portion 5c is brought into contact with the yoke end 3a, to form an obtuse angle in a right-angle direction.

With the present structure, it is possible to absorb the dimensional tolerance of each part upon bending from an obtuse angle in the right-angle direction.

Further, with an elastic force upon bending from the obtuse angle in the right-angle direction, a force pressing the end bent portion 5c against the yoke end surface 3 acts, and they are always in contact. Even upon occurrence of crack or chip of the ferrite magnet 4, it is possible to prevent dispersion of the cracked or chipped pieces from the rotor 102.

Figure 11:
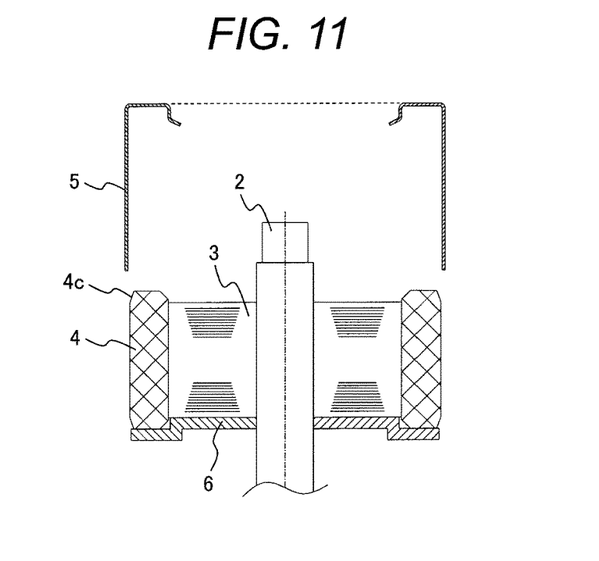
FIG. 11 is a detailed structural diagram (part 5) of the rotor.

FIG. 11 is a detailed cross-sectional diagram (part 5) of the rotor and a cross-sectional diagram immediately before fit-insertion of the protective cover 5.

Figure 12:
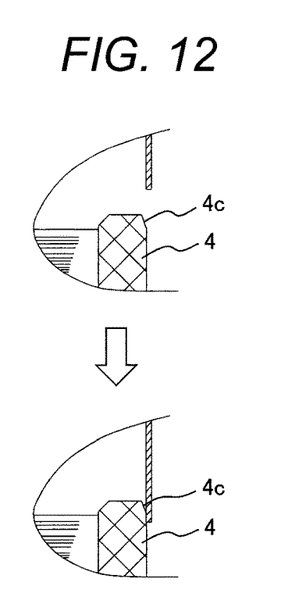
FIG. 12 is a diagram of a fit-insertion structure (part 1) of the protective cover.

FIG. 12 illustrates a fit-insertion structure (part 1) of the protective cover.

The ferrite magnet 4 has a taper portion 4c at its end surface. Upon fit-insertion of the protective cover 5, the taper portion 4c has a function of positioning the protective cover 5, thus facilitating fit-insertion of the protective cover 5.

Figure 13:
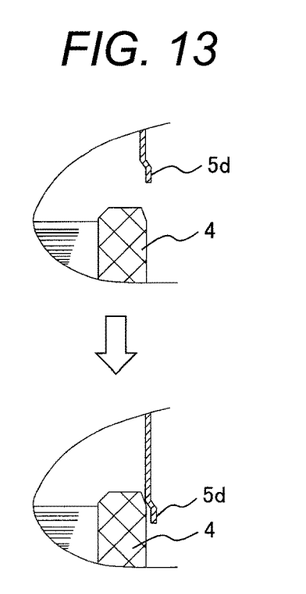
FIG. 13 is a diagram of the fit-insertion structure (part 2) of the protective cover.

FIG. 13 is a fit-insertion structure (part 2) of the protective cover.

The protective cover 5 has a protective cover step portion 5d at its end. Upon fit-insertion of the protective cover 5, the protective cover step portion 5d has a function of positioning of the protective cover 5, thus facilitating fit-insertion of the protective cover 5.

REFERENCE SIGNS LIST

100 . . . rotating electric machine, 101 . . . stator, 102 . . . rotor, 1 . . . stator core, 1a . . . stator core end surface, 2 . . . shaft, 3 . . . yoke, 3a . . . yoke end surface, 3b . . . yoke step portion, 4 . . . ferrite magnet, 4a . . . projection, 4b . . . tolerance projection, 4c . . . taper portion, 5 . . . protective cover, 5a . . . concave portion, 5b . . . L-shaped bent portion, 5c . . . end bent portion, 5d . . . protective cover step portion, 6 . . . end plate, 6a . . . step portion, 7 . . . bearing, 8 . . . housing, 9 . . . connector housing, 10 . . . cover, 11 . . . bus bar, 12 . . . terminal table, 13 . . . bobbin, 14 . . . coil winding, 15 . . . coil end, 16 . . . connection portion, 17 . . . bearing case, 18 . . . plate, 19 . . . bolt, 20 . . . gap, 21a . . . 21 . . . second end plate, 22 . . . second step portion, 23 . . . bottom surface, 24 . . . step portion

The invention claimed is:

1. A rotating electric machine comprising:
a cylindrical stator core;
a rotor having a shaft provided on the inner circumferential side of the stator core;
a yoke fixed to the shaft;
at least one ferrite magnet provided on the outer circumferential surface of the yoke; and
a protective cover provided on the outer circumference of the ferrite magnet, wherein
opposing end surfaces of the ferrite magnet are projected with respect to axial end surfaces of the yoke, such that the opposing end surfaces of the ferrite magnet extend further along a longitudinal direction of the shaft than the axial end surfaces of the yoke,
the yoke has a step portion to form a gap between the end surface of the ferrite magnet and a bottom surface of the protective cover, and
the step portion extends further along a longitudinal direction of the shaft than the projected part of the ferrite magnet.

2. The rotating electric machine according to claim 1, wherein the protective cover is L-shaped and directly contacts an entirety of the step portion of the yoke portion.

3. The rotating electric machine according to claim 2, wherein the stator core is shorter than the ferrite magnet.

4. The rotating electric machine according to claim 2, wherein the protective cover is provided with a concave portion having a step portion to avoid a projection of the ferrite magnet.

5. The rotating electric machine according to claim 4, wherein the concave portion of the protective cover has an obtuse bent portion at the beginning of the concave portion, wherein the yoke and the bent portion are in contact, and wherein the bent portion is deformed in a direction from an obtuse angle toward a right angle.

6. The rotating electric machine according to claim 2, a gap is formed with respect to the projections of the ferrite magnet.

7. The rotating electric machine according to claim 2, further comprising an end plate having a step portion for positioning of the ferrite magnet.

8. The rotating electric machine according to claim 2, further comprising a second end plate on the end surface of the yoke, wherein a second step portion in contact with an L-shaped bent portion of the protective cover is provided on the outer circumferential side of the second end plate, and wherein a gap is provided with respect to the projection of the ferrite magnet.

9. A rotating electric machine comprising:
  a cylindrical stator core;
  a rotor having a shaft provided on an inner circumferential side of the cylindrical stator core;
  a yoke fixed to the shaft;
  at least one ferrite magnet provided on an outer circumferential surface of the yoke; and
  a protective cover provided on an outer circumference of the at least one ferrite magnet, wherein
    the at least one ferrite magnet has a projection projecting upward from an axial end surface of the yoke, such that the projection extends further along a longitudinal direction of the shaft than the end surface of the yoke,
    the protective cover defines a gap between an end surface of the projection and the protective cover, and
    the step portion extends further along a longitudinal direction of the shaft than the projected part of the ferrite magnet.

* * * * *